United States Patent [19]
Bucher

[11] 3,714,699
[45] Feb. 6, 1973

[54] METHOD OF INSERTING FLEXIBLE STRAND MEMBERS THROUGH A PERFORATE FITTING

[75] Inventor: Robert W. Bucher, Glendale, Ariz.
[73] Assignee: The Goodyear Tire & Rubber Company, Akron, Ohio
[22] Filed: July 19, 1971
[21] Appl. No.: 163,853

[52] U.S. Cl. .................................... 29/241, 29/433
[51] Int. Cl. .......................................... B23p 19/04
[58] Field of Search ........... 29/429, 433, 241; 223/99

[56] References Cited

UNITED STATES PATENTS

| | | | |
|---|---|---|---|
| 2,287,287 | 6/1942 | Boltz | 29/241 |
| 2,536,677 | 1/1951 | Brunner et al. | 29/241 X |
| 2,901,819 | 9/1959 | Schaffan | 29/241 |
| 3,001,270 | 9/1961 | Friedman | 29/241 |
| 3,239,928 | 3/1966 | Baker | 29/241 |

Primary Examiner—Charlie T. Moon
Attorney—F. W. Brunner et al.

[57] ABSTRACT

A method and apparatus for inserting flexible cords or strands through holes in a perforate fitting for a high strength container such as a crash resistant fuel tank. A fixture is attached to one end of a plurality of elongated rods to support them parallel to each other in a position to match the hole pattern of the fitting to permit a plurality of the fittings to be slid onto the free end of the rods with each hole of each fitting having one of the rods passing therethrough. A plurality of cords or strands are looped around a hook on the free end of each rod and are fastened to a remote retaining member to position the strands in substantially axial alignment with the rods and provide an elongated extension of the rods so that each fitting may be slid from the rods onto the strands. The fittings are then spaced apart from each other on the strands and the strands are cut midway between each fitting leaving a group of strands through each hole of each fitting for attaching the fitting to a container wall.

8 Claims, 14 Drawing Figures

INVENTOR.
ROBERT W. BUCHER
BY *P. Milliken*
ATTORNEY

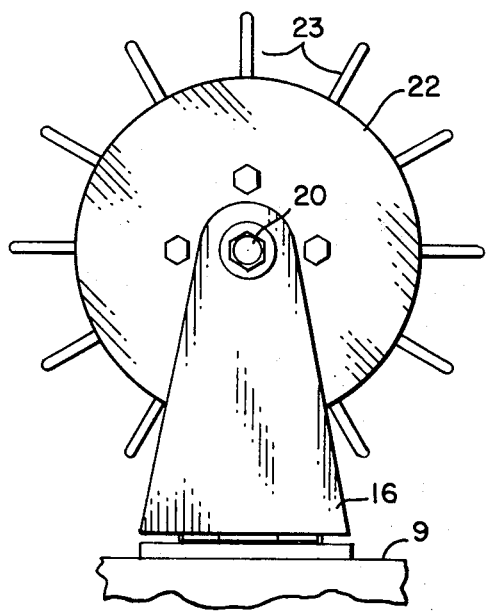
FIG. 3
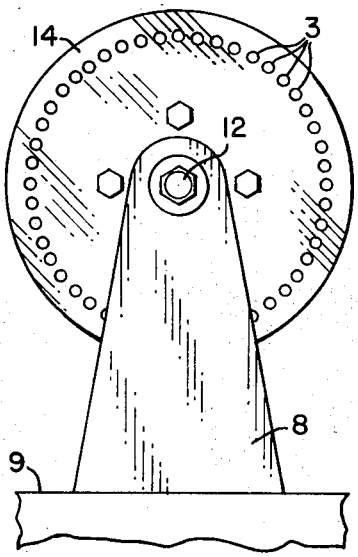
FIG. 4
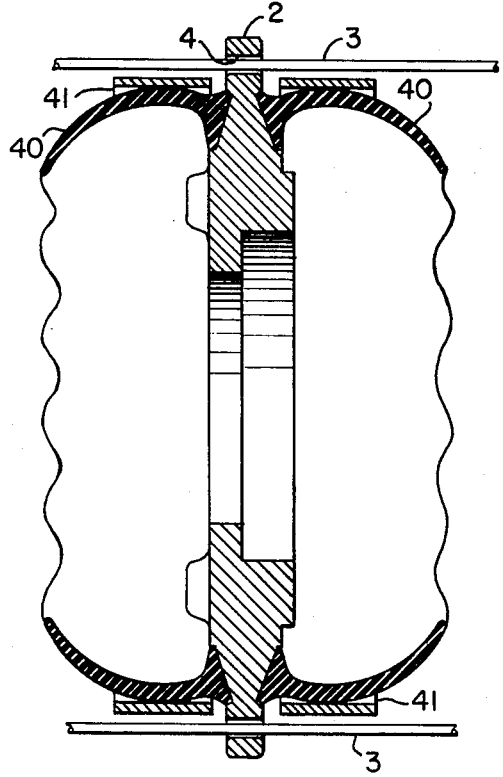
FIG. 5
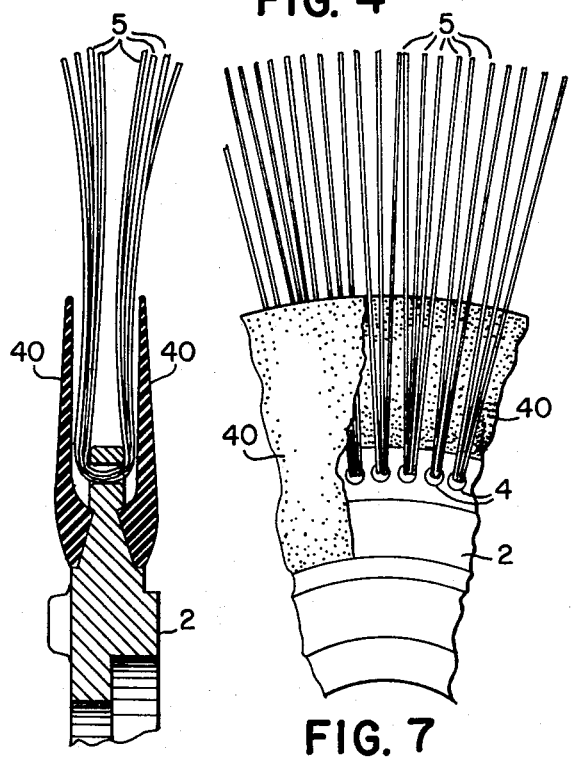
FIG. 6
FIG. 7
INVENTOR.
ROBERT W. BUCHER
BY *A. Milliken*
ATTORNEY

INVENTOR.
BY ROBERT W. BUCHER
ATTORNEY

METHOD OF INSERTING FLEXIBLE STRAND MEMBERS THROUGH A PERFORATE FITTING

This invention relates to a method and apparatus for inserting flexible cords or strands through holes in a perforate fitting for use in a crash-resistant fuel tank.

BACKGROUND OF THE INVENTION

In the past, various attempts have been made to design high strength fittings for fuel tanks such as those used on helicopters or other aircraft to prevent the fitting pulling loose from the fabric wall of the fuel tank, thereby resulting in loss of fuel and creating the possibility of fire or explosion. The problems of fittings pulling loose normally occur during a situation such as a crash where the fuel tank and fitting are subjected to high impact loads. This problem is created by the fact that it is difficult to obtain adhesion between a metal fitting and a rubberized fabric wall. For this reason, various mechanical connecting means have been devised between the metal and the fabric to provide more positive interlocking of the fitting with the fabric wall of the fuel rank. Various types of enlarged bead rings retained in grooves in the metal fitting have been tried but have not proven satisfactory since under high impact loads there is a tendency for this type of connection to pull loose. One type of connection which was found to have superior strength was that in which a series of cords or strands of material were interlocked with a metal fitting by passing them through a series of holes arranged in a circumferential row near the periphery of the fitting and arranging the strands to extend radially outwardly from the fitting and then adhering the strands to the rubberized fabric material. One of the problems encountered in producing a fitting in this manner is the time-consuming operation of passing the cords or strands through the holes in the fitting.

OBJECTS OF THE INVENTION

It is a primary object of this invention to provide a machine which will permit a large number of perforate metal fittings to be threaded with cords of strands simultaneously and thereby eliminate the time-consuming operation of individually stringing each metal fitting by hand. This and other objects of the invention will become more readily apparent as the description proceeds in the following specification and the accompanying drawings.

BRIEF DESCRIPTION OF THE DRAWINGS

FIG. 3 is an end view of the apparatus shown in FIG. 2 showing the strand-retaining end of the apparatus;

FIG. 4 is an end view of the apparatus shown in FIG. 2 showing the rod-support end of the apparatus;

FIG. 5 is a detailed cross-sectional view showing a typical fitting positioned on the rods of the apparatus shown in FIG. 2;

FIG. 6 is a fragmentary cross-sectional view showing a typical fitting after the strands or cords have been inserted through the holes and have been oriented in a radially outwardly extending direction;

FIG. 7 is a fragmentary plan view of the fitting shown in FIG. 6;

DESCRIPTION OF THE PREFERRED EMBODIMENTS

Figure 1:
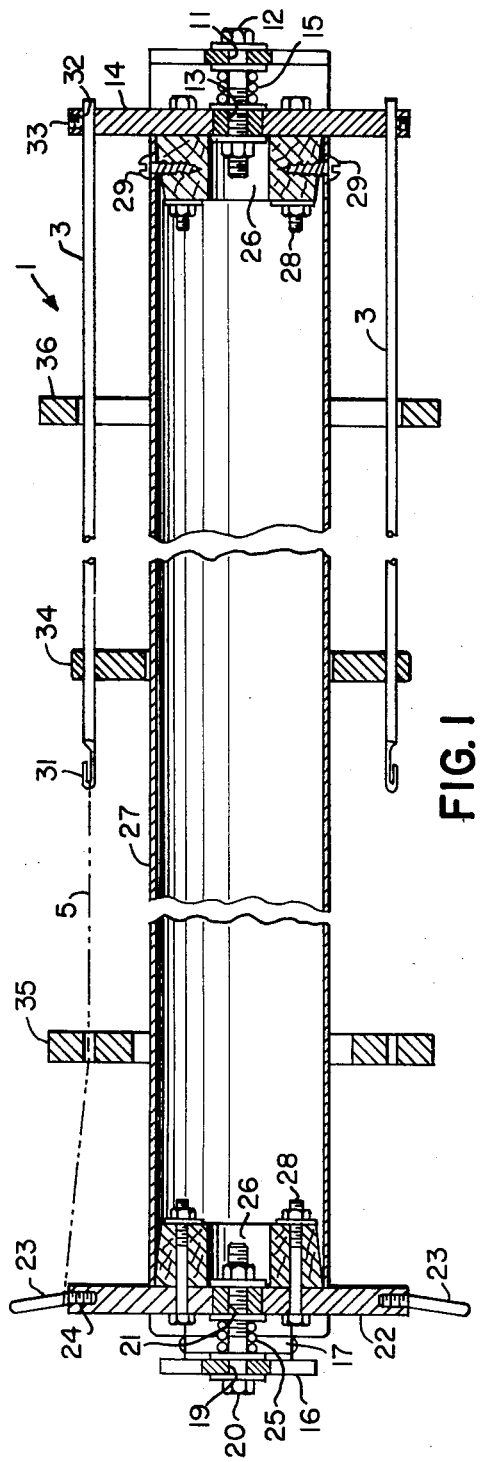
FIG. 1 is a cross-sectional view taken in line 1—1 of FIG. 2 showing one embodiment of the apparatus of the invention.
Figure 2:
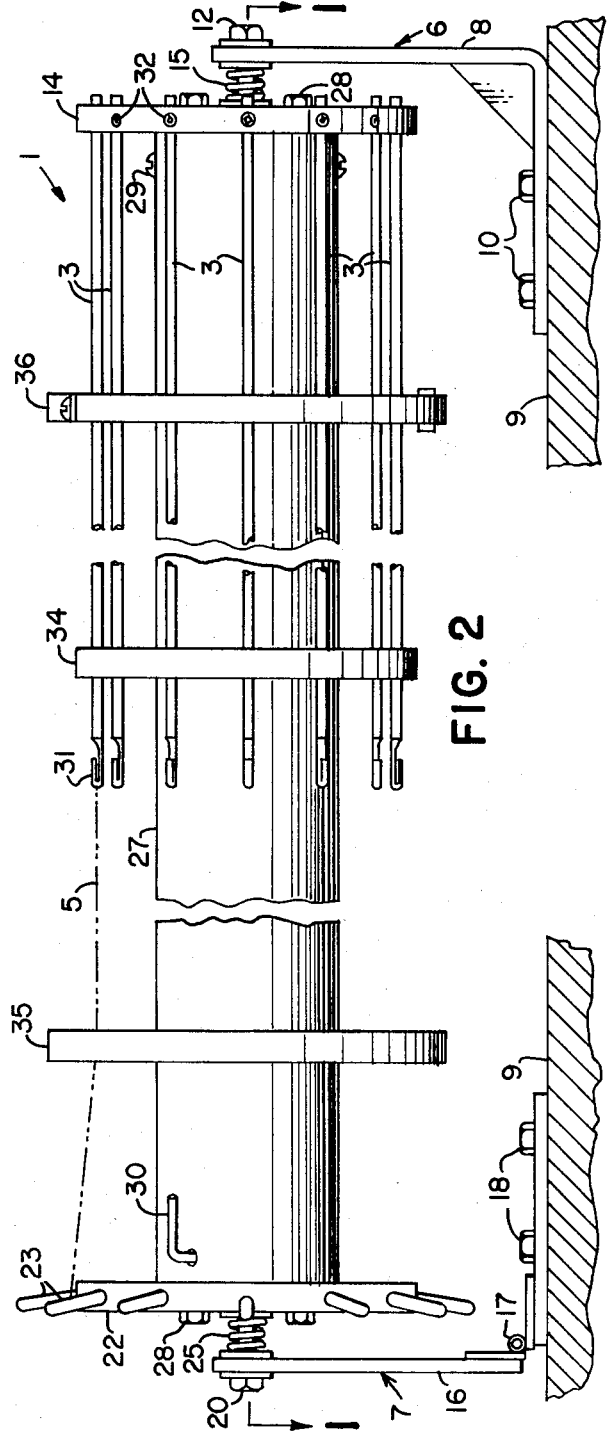
FIG. 2 is a side elevational view of one embodiment of the apparatus of the invention.

Referring now to FIGS. 1 and 2, a stringing apparatus for inserting flexible strand members simultaneously through a series of perforate fittings is illustrated generally by the numeral 1. The apparatus 1 is designed to support a plurality of fittings 2 such as that shown in FIG. 5 on a plurality of parallel rods 3 extending through a circumferential row of holes 4 near the outer periphery of the fitting. A plurality of cords or strands 5 are positioned on the apparatus 1 in a manner which will be hereafter described and the fittings 2 are then slid from the rods 3 onto the cords 5 in spaced apart relationship. The cords 5 are then severed midway between each fitting to provide each fitting with a series of radially outwardly extending strands 5 as shown in FIGS. 6 and 7. The strands 5 provide a compatible bonding structure which, when adhered to a rubberized fabric wall of a fuel tank, will provide a very strong bond. A typical example of how the strands 5 are bonded to a rubberized fabric fuel tank wall is illustrated in FIG. 1 of U.S. Pat. No. 3,534,987 in which I am a co-inventor.

Returning now to FIGS. 1 and 2, the apparatus 1 has a rod-support assembly 6 on one end thereof and a strand-retaining assembly 7 on the opposite end. The rod-support assembly has a bracket 8 attached to a base 9 by bolts 10. The bracket 8 has a centrally located hole 11 with a bolt 12 passing therethrough and through a hole 13 in a circular rod-support plate 14. A spring 15 is mounted on the bolt 12 between the bracket 8 and the plate 14 to provide a friction clutch to resist rotation of the plate 14. On the opposite end of the apparatus, the strand-retaining assembly 7 has a hinged bracket 16 which has a hinge 17. The bracket 16 is connected to the base 9 by bolts 18. The upper portion of the bracket 16 has a centrally located hole 19 therethrough which receives a bolt 20 which also passes through a hole 21 in a circular strand-retaining plate 22 which has a plurality of spaced apart radially outwardly extending pegs 23 which are screwed into threaded holes 24. A spring 25 functions in the same manner as the spring 15 on the opposite end to provide a friction clutch to resist rotation of the plate 22. Both the plate 14 and 22 have a centrally located tube support ring 26 on the axially inner side thereof for supporting a hollow tube 27. The rings 26 are connected to their respective plates by bolts 28 or other suitable means. The tube 27 is permanently fastened at the rod-support plate. The tube 27, however, is removably fastened at the strand-retaining plate by a lock pin 30. When removed, the lock pin permits the entire strand-retaining assembly 7 to be swung about the hinge 17 and removed from the end of the tube to permit the fittings 2 to be slid onto the tube and then onto the rods 3. The tube 27 stabilizes the rod-support assembly 6 and strand-retaining assembly 7 and permits the plate 14 and 22 to be rotated about the bolts 12 and 20 when the strands 5 are being connected between the rods 3 and the pegs 23. A fewer number of rods 3 and pegs 23 are shown in the drawings than are actually used on most actual apparatus. This is merely for the purpose of simplifying the illustration in the drawings. In actual practice, the number of rods 3 which are used is closer to that illustrated in FIG. 4 in which a series of rods are shown in a circular pattern in close proximity to each other. This is necessary because, in most instances, the holes 4 in fitting 2 are very close together around the circumference of the fitting and one rod 3 is needed to pass through each of the holes 4. The rods 3 function much in the same manner as a needle for drawing a piece of thread through a hole. The only difference is that instead of drawing the rod 3 and the cord or strand 5 through the fitting, the fitting is first positioned on the rods 3 and then slid axially off the rods onto the strands 5 which are threaded through a hook 31 at the free end of each rod 3. Usually there are fewer pegs 23 required than there are rods with each peg being used in conjunction with several rods.

In operation of the apparatus, a group of fittings is strung in the following manner. The lock pin 30 is removed to permit the strand-retaining assembly to be swung downward away from the end of the tube 27. It should be mentioned that in some instances where the stringing apparatus 1 is relatively short in length for stringing a small number of fittings that the tube 27 may not be necessary. Where the tube 27 is used, however, it is fastened to the rod-support assembly as previously mentioned by the screws 29. Each of the rods 3 are fastened in a hole 32 in the plate 14 by a set screw 33. The opposite end of the rods 3 are free to receive a rod separator ring 34 which has a similar hole pattern to the fittings 2 and holds the free ends of the rods 3 to maintain the rods in parallel spaced relationship until the fittings 2 are placed thereon.

Figure 8:
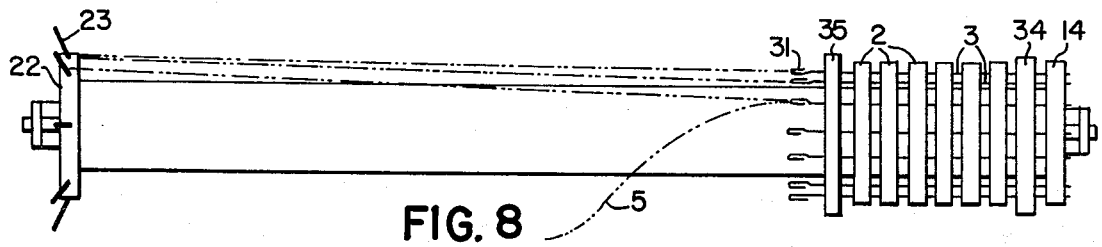
FIG. 8 is a simplified plan view of the apparatus shown in FIG. 2 with a series of fittings arranged on the rods of the apparatus and with part of the strands placed in position on the apparatus.
Figure 9:
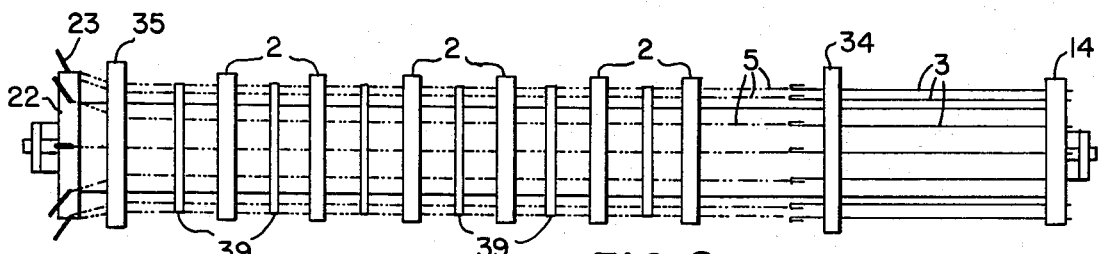
FIG. 9 is a view similar to FIG. 8 but showing the fittings moved from the rods onto the strands in position for separation.
Figures 10, 11:
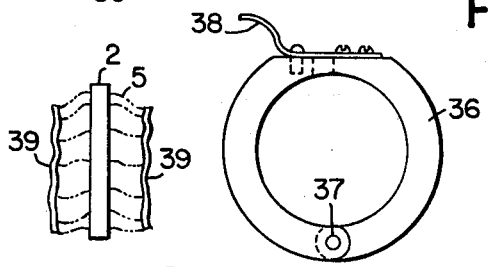
FIG. 10 is a side elevational view showing a fitting with strands therethrough after it has been severed from its position on the apparatus shown in FIG. 9.
FIG. 11 shows a detailed view of the pulling ring guide used on the apparatus previously described.

As shown in FIG. 8, a plurality of fittings are slid onto the rods 3 with each hole of the fitting having a rod passing therethrough. The rod separator 34 is moved adjacent the rod support plate 14 when the fittings 2 are positioned on the rods. A cord or strand separator ring 35 is positioned on the rods 3 following the fittings 2. The cords or strands 5 are then applied to the apparatus 1 by alternately passing them through the hooks 31 at the ends of the rods 3 and then looping them around one of the pegs 23 on the strand-retaining plate 22. After the strands 5 have been connected between each rod 3 and one of the pegs 23, the strand separator ring 35 is then moved off the rods 3 and along the strands 5 until it is adjacent the strand-retaining plate 22. The strand separator ring 35 aligns the strands 5 in parallel relationship to receive the fittings 2. A pulling ring guide 36 shown in FIG. 11 is then placed on each of the fittings 2 and the fitting is then moved along the strands 5 in spaced apart relationship as shown in FIG. 9. The ring guide 36 is hinged at 37 to open for engaging each of the fittings 2 and has a latch 38 for retaining it in a closed position once the fitting is engaged. Once the fittings 2 are spaced apart along the strands 5, a piece of tape 39 is passed around the strands midway between each of the fittings. The strands 5 are then severed at the center of the tape so that each fitting along with a length of the strands 5 as shown in FIG. 10 may be removed from the apparatus 1. The fitting and strands as shown in FIG. 10 is then ready for further processing for assembly into a fuel tank.

Many of the fittings to receive strands in this manner, have a pair of wedge-shaped rubber filler rings 40 which extend radially outwardly as shown in FIG. 6. When such filler rings are present, it is necessary to bend them radially inwardly in order to permit passage of the rods 3 through the holes 4 as shown in FIG. 5. In order to hold the filler rings 40 in this position, a circular band 41 is applied to each filler ring as shown in FIG. 5. This leaves the holes 4 exposed to receive the rods 3. Once the fittings 2 are removed from the rods 3, the bands 41 may then be removed to permit the filler rings 40 to return to their normal position as shown in FIG. 6.

FIG. 7 illustrates the position of the filler rings in a plan view of the fitting 2.

Figure 12:
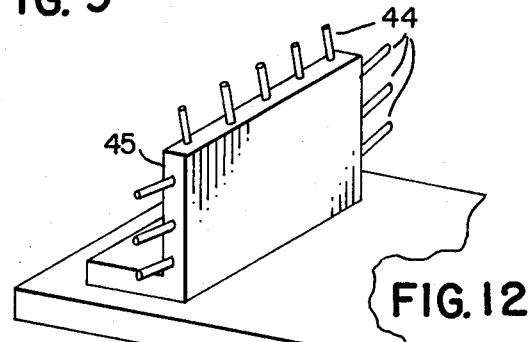
FIG. 12 shows a perspective view of the strand-retaining end assembly of another embodiment of the invention.
Figure 13:
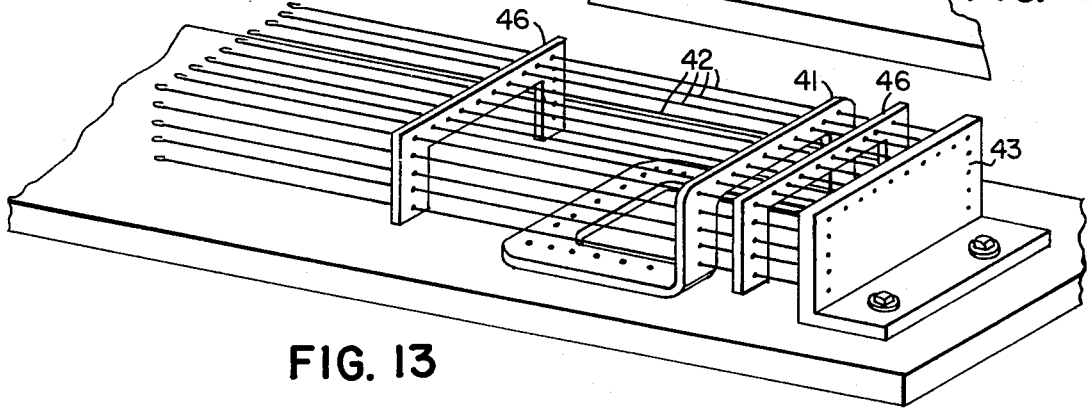
FIG. 13 shows a perspective view of the rod-supporting assembly of an embodiment of the invention used with the device shown in FIG. 12.
Figure 14:
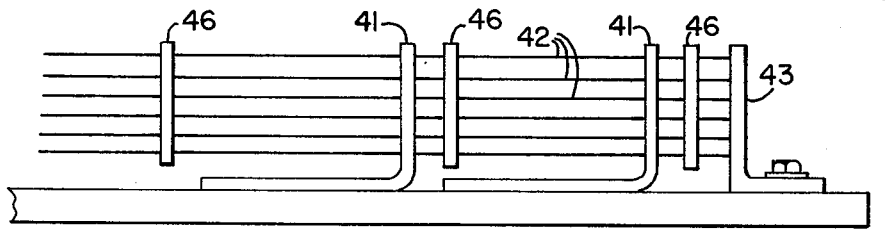
FIG. 14 is a fragmentary side elevational view showing the embodiment shown in FIG. 13.

FIGS. 12 through 14 illustrate another embodiment of the invention in which the fittings 41 lie in two different planes rather than in a single plane as does the fitting 2. In a double plane fitting such as the fitting 41, it is necessary to insert the strands in two different steps if a strand is being inserted in each plane at a different time. In FIG. 13 a fitting 41 has one of its planes positioned on a plurality of rods 42 which are supported by a rod support 43. The rods are similar to the rods 3 in the previous embodiment and the strands to be inserted through the fitting 41 are connected between the hooks on the free ends of the rods 42 and a plurality of pegs 44 on a strand support bracket 45. Alternately between each of the fittings 41 is a rod spacer 46 as shown in FIGS. 13 and 14 to hold the rods 42 in parallel spaced relationship while the next adjacent fittings 41 are being placed on the rods. After the fittings 41 are all positioned on the rods and the strands are connected between the rods and the pegs 44 in the same manner as described previously in the embodiment shown in FIGS. 1 through 9, the same steps are followed as were applied to the previous embodiment. The fittings 41 are slid onto the strands and then taped and severed from each other. After one plane of the fitting has been strung in this manner, the fitting is then turned and positioned on a set of rods and the operation repeated to string the other plane.

While only two shapes of fittings have been illustrated herein, it should be understood that various shapes of fittings and various fittings have multi-planes can be strung in a similar manner. One of the primary features of the invention is, of course, that a plurality of fittings can be positioned on the rods and then simultaneously slid onto a plurality of parallel strands extending from one end of the rods. Various modifications may be made in the shape of the fittings and the detailed structure of the apparatus without departing from the scope of the invention.

I claim:

1. An apparatus for inserting flexible strands through holes in a perforate fitting comprising:
   A. a rod support means;
   B. a plurality of elongated rods each having one end attached to the support means and the opposite end of each rod being a free end;
   C. the rod support means holding the rods substantially parallel to each other and in a relative position to conform to the position of the holes in the perforate fitting to permit a plurality of fittings to be slid onto the rods with each hole of each fitting having one of the rods passing therethrough; and
   D. a strand retaining means, spaced at a substantial distance from the free ends of the rods, supporting a plurality of strands connected to the free ends of the rods and to the strand retaining means in a position to form an axial extension of the rod so that each fitting may be slid from the rods onto the strands and positioned in spaced apart relationship from each other along the strands whereby the strands may be cut between each adjacent pair of fittings to permit removal of the fittings from the apparatus with each fitting retaining a plurality of strands in each hole of the fitting.

2. The apparatus claimed in claim 1 including means connecting the rod support means and the strand retaining means.

3. The apparatus claimed in claim 1 wherein the rod support means and the strand retaining means are both pivotally mounted to be rotatable about a common axis.

4. The apparatus claimed in claim 1 including a rod separator having a plurality of holes conforming to holes in the fitting, said separator being slidably mounted on the rods to retain the free ends of the rods in spaced relationship to each other until the fittings are positioned on the rods.

5. The apparatus claimed in claim 1 including a slidable strand separator to be moved longitudinally along the strands, after they are connected between the free ends of the rods and the strand retaining means, to position the strands for receiving the fittings as they are slid on the rods.

6. The apparatus claimed in claim 1 wherein the fittings are generally circular and the holes are located in a generally circular pattern thereon.

7. The apparatus claimed in claim 1 wherein the fitting is a multi-plane fitting and the strands are inserted simultaneously in the holes located in one plane of the fitting but independently from the holes of the other planes of the fitting.

8. The apparatus claimed in claim 1 including auxiliary gripping means to engage each fitting and aid in sliding the fitting from the rod and along the strands.

* * * * *